Jan. 26, 1932.  H. WILKINSON  1,842,438
AUTOMATIC CONTROL OF PNEUMATICALLY CONVEYED COTTON OR SUCH LIKE
Filed June 5, 1931  5 Sheets-Sheet 1
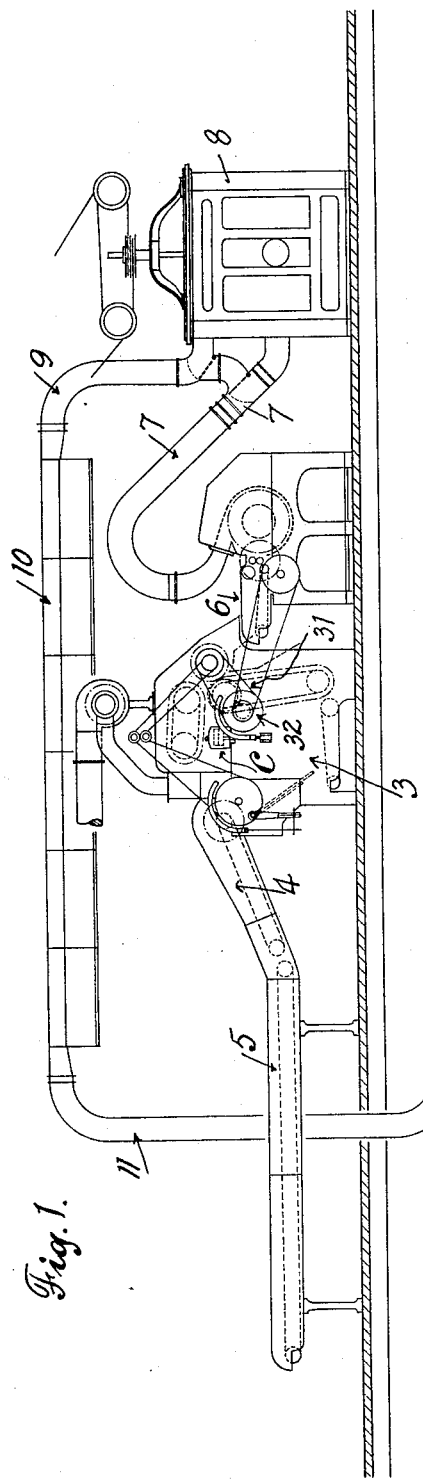
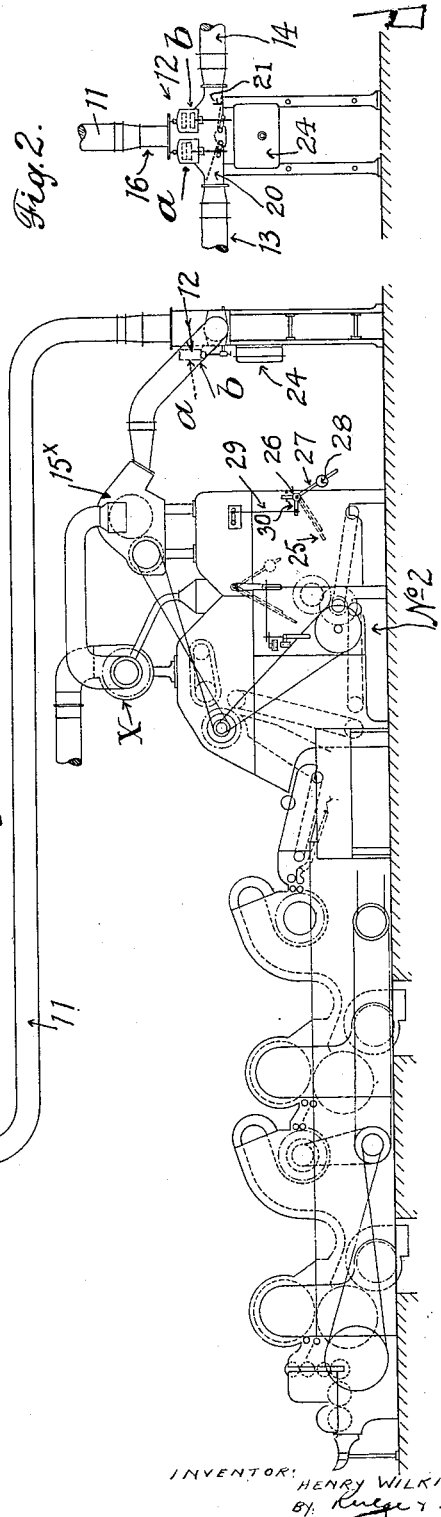
INVENTOR:
HENRY WILKINSON
BY Kruege y Boyce
ATTORNEYS.

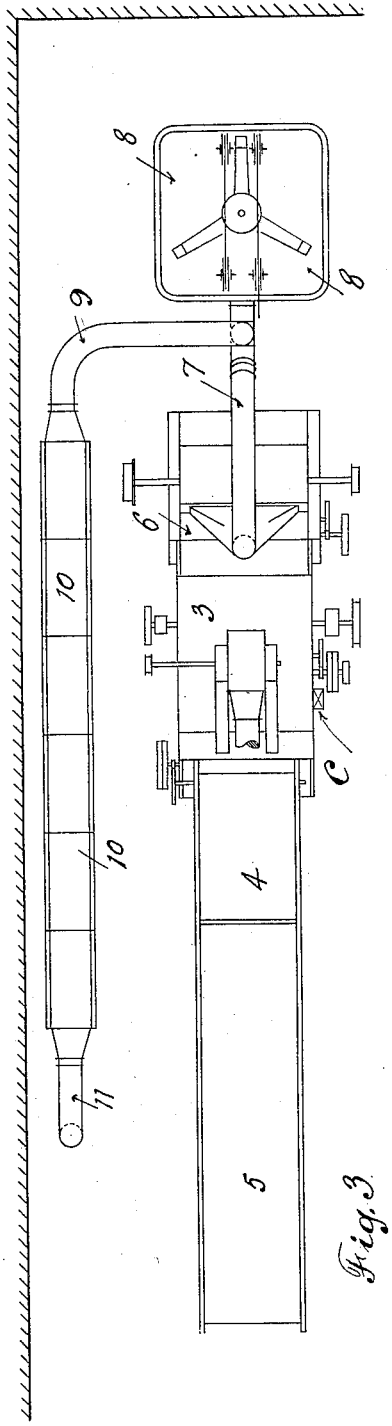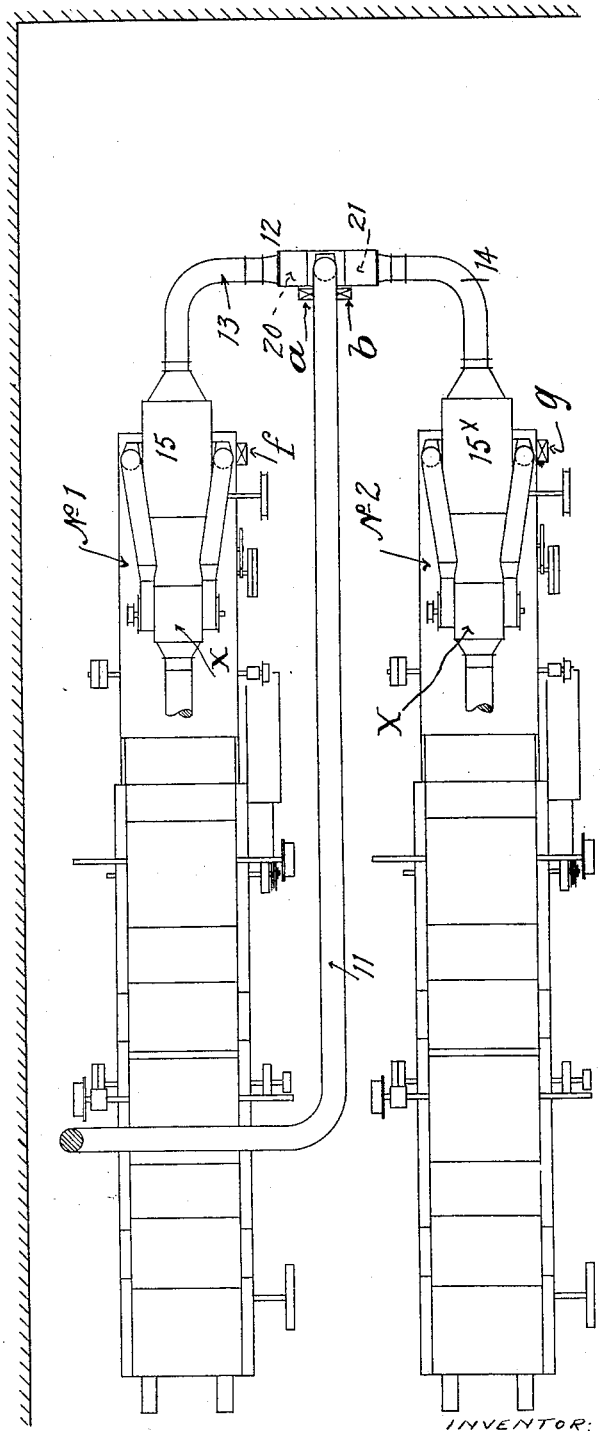
Fig. 3
INVENTOR:
HENRY WILKINSON
BY Kruge + Boyer
ATTORNEYS.

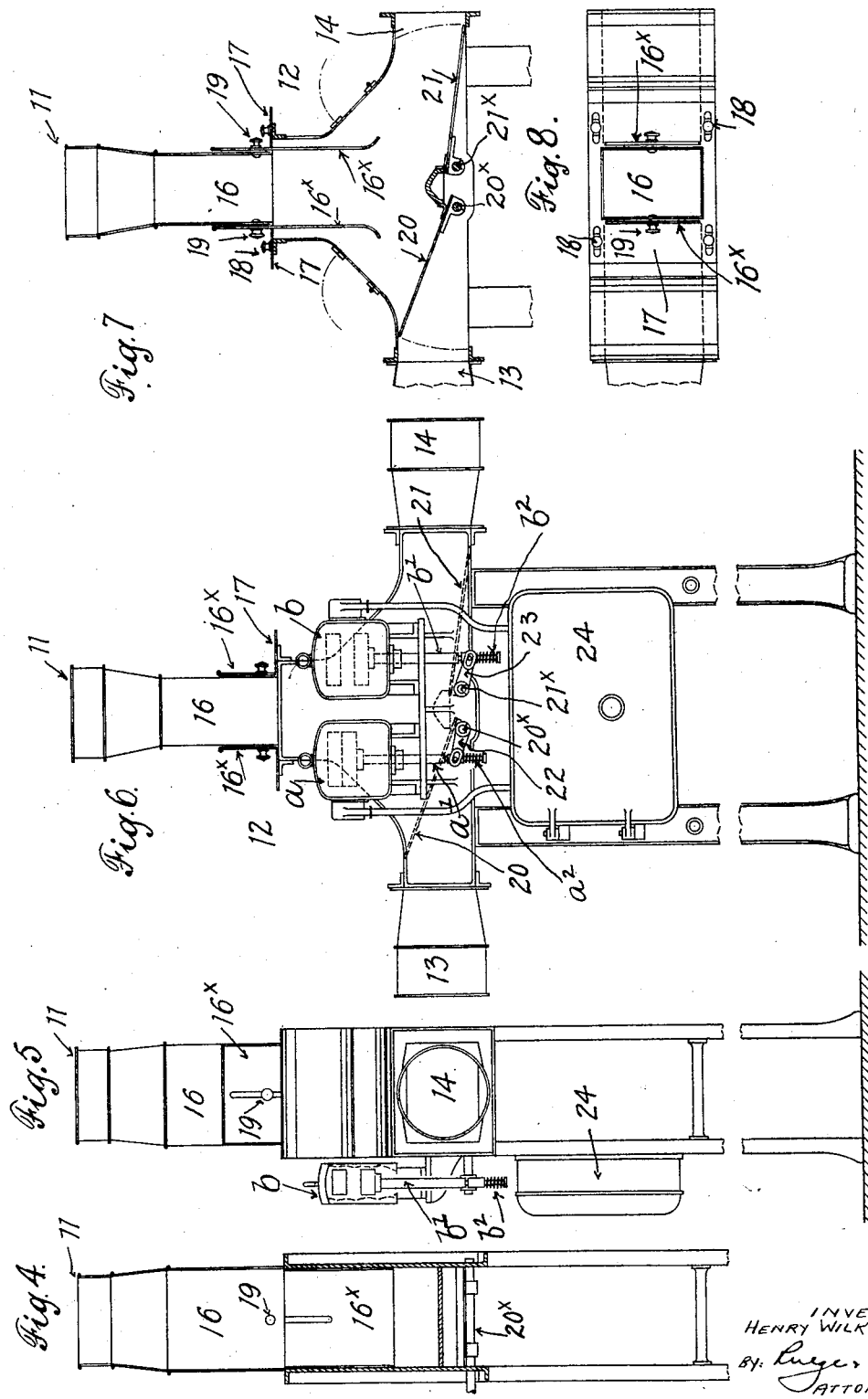

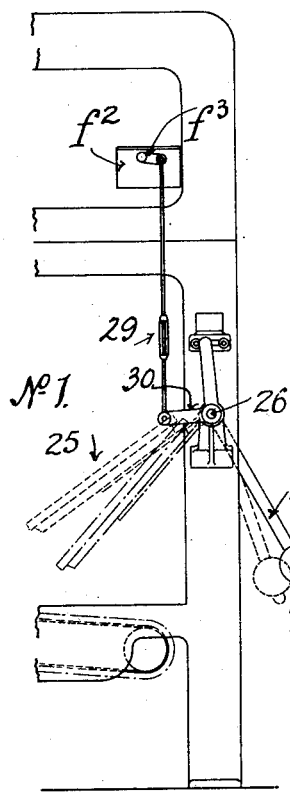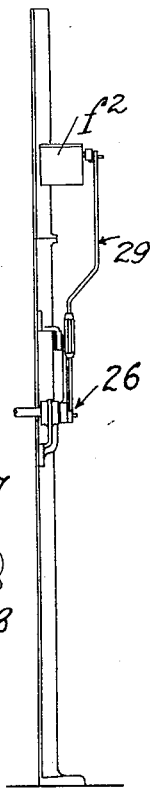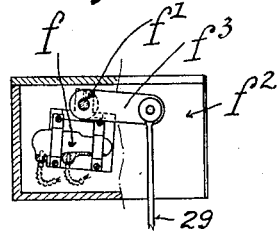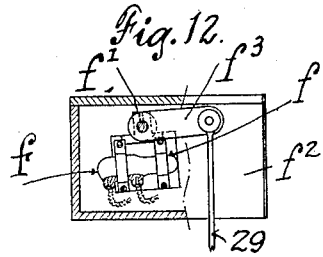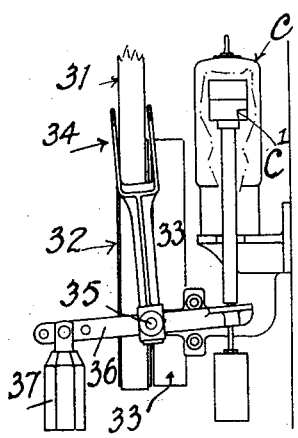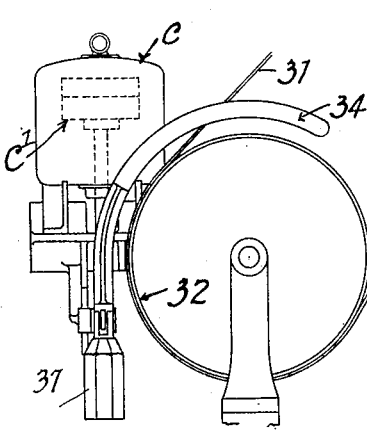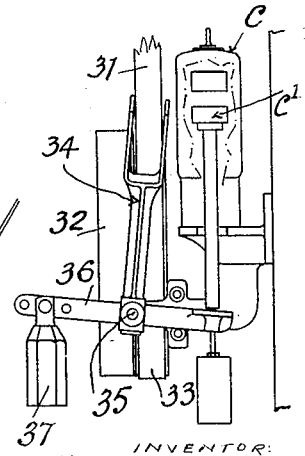

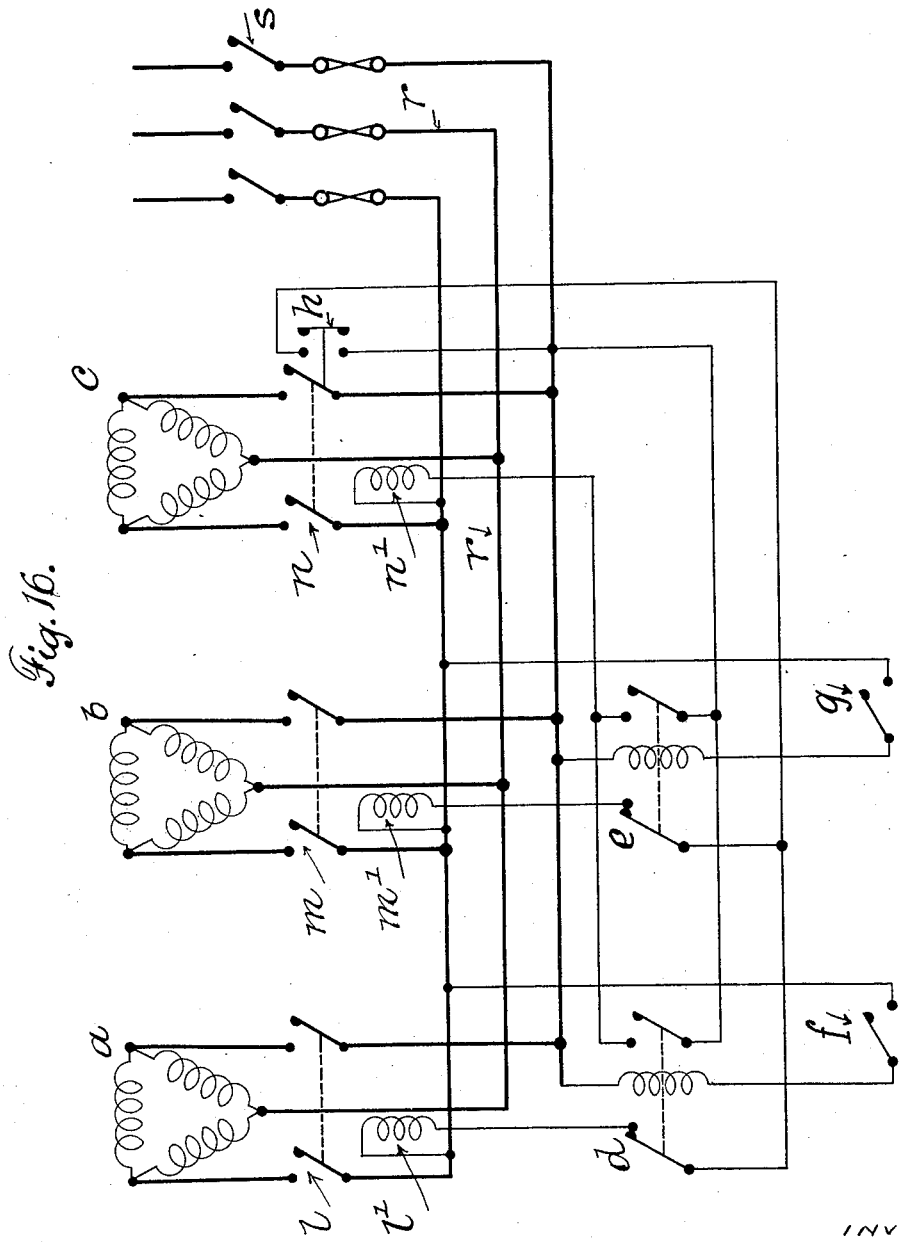

Patented Jan. 26, 1932

1,842,438

UNITED STATES PATENT OFFICE

HENRY WILKINSON, OF OLDHAM, ENGLAND, ASSIGNOR OF ONE-HALF TO PLATT BROTHERS AND COMPANY LIMITED, OF OLDHAM, ENGLAND

AUTOMATIC CONTROL OF PNEUMATICALLY CONVEYED COTTON OR SUCH LIKE

Application filed June 5, 1931, Serial No. 542,281, and in Great Britain August 23, 1930.

It is known to combine bale breakers and hopper openers, bale breakers and Crighton openers, hopper openers with lattice feeder and dust trunks, and other groups, which may be broadly styled preliminary opening or mixing apparatus groups, and to convey the cotton from these preliminary opening groups pneumatically to a hopper feeder or such like which may form part of a refining or blowing room group or combination which still further opens the fibre and passes same on to any further grouped or combined apparatus, which I may for convenience term "hopper feeder apparatus", just as I may term the preliminary group "mixing or opening apparatus".

This invention contemplates the automatic control of pneumatically conveyed cotton or other textile fibre from a "mixing or opening apparatus" to a plurality of "hopper feeder apparatus", that is, I combine with the one mixing apparatus two or more hopper feeder apparatus, on a system which permits of the fibre being pneumatically conveyed to either or both of the hopper feeder apparatus, as may be called for by requirements, whereby at any particular time, both of the two hopper feeder apparatus, or either of them, may be fed, and the feeding automatically controlled. Further, in case neither of the hopper feeder apparatus really requires a supply, for the time being, the supply from the mixing or opening apparatus is cut off automatically. Further, in order to prevent any objectionable piling-up of fibre in the main conveying tube I arrange, that when the mixing or opening apparatus is automatically cut off, the balance of fibre in the main conveying tube is distributed to the two hopper feeder apparatus, and so is entirely or substantially cleared up. Further, in order to better control the dividing of the cotton or other textile fibre equally between the two hopper feeder apparatus, I arrange a movable inlet device at or near the junction box where the off-set feeder tubes branch to each hopper feeder apparatus. It is an important feature of my invention, that I intend to use electrically controlled mechanism which is arranged to work automatically for the purposes in view and I use solenoid apparatus, small motors, electro-magnetic or any other electrical devices which will serve my purpose, and I make use of pivoted mercury tube switches for current controlling, because these are simple and free from risk and can be mounted in housings in connection with the hopper feeder apparatuses. I further arrange for the weight of fibre in the two hopper feeder apparatuses to govern through mechanical contrivances the position of the mercury tube switches, whereby the circuits are closed or broken as is requisite for the objects in view. I also electrically control the starting and stopping of the mixing or opening apparatus as is requisite for carrying out my object, and I require to provide automatic damper devices hereafter termed "valves" in connection with the two off-set feeder tubes leading from the main conveying tube fed from the mixing or opening apparatus, and these valves are electrically controlled and their position is automatically governed by the contents of each of the two or more hopper feeder apparatus.

I in no way limit myself as to the electrical and mechanical devices which may be employed to carry out the objects related, nor to any combination of interconnected groups of textile apparatus, nor as to whether the mixing or opening group feeds two or more of the hopper feeder apparatuses.

With the object of better ascertaining the subject-matter of the invention and to convey a proper understanding thereof, I hereafter describe one of the simplest arrangements for carrying the invention into effect and this arrangement is illustrated along with the necessary mechanism and one scheme of electrical equipment on the accompanying drawings, wherein:—

Fig. 1 is an elevation showing a group of preliminary mixing or opening apparatus, combined with and feeding to or supplying two separate hopper feeder apparatuses furnished with lap forming mechanism. The two groups of apparatus are indicated as being on different floor levels.

Fig. 2 is a broken front view looking towards the junction structure where the conveying tube delivers to the tubes which feed the condensers supplying the hopper feeder apparatuses and where the control valves and their operating solenoids are fitted.

Fig. 3 is a general plan view of the whole of the apparatuses seen in Fig. 1.

Fig. 4 is a sectional view of the junction structure and its combined adjustable plates.

Fig. 5 is an end view of the junction structure and shows one of the valve operating solenoids.

Fig. 6 shows a front view of the junction structure with the supply tube from the preliminary mixing or opening apparatus, the control valves, their solenoids, and the tubes which feed the condensers in connection with the hopper feeder apparatuses.

Fig. 7 is a sectional view of parts also seen in Fig. 6.

Fig. 8 is a plan view of Fig. 7.

Fig. 9 shows a fragmentary view and indicates the pivoted board in the "reserve box" of one of the hopper feeders and the connections therefrom which control one of the mercury tube switches.

Fig. 10 is a side view of Fig. 9.

Fig. 11 shows separately one of the mercury tube switches in the "break" position.

Fig. 12 shows said mercury tube switch in the "make" position.

Fig. 13 is a view showing the solenoid and the belt shifting mechanism in connection with the hopper opener of the mixing or opening apparatus, the core of the solenoid being shown in the operative position to put the belt onto the fast-pulley.

Fig. 14 shows a side elevation of Fig. 13.

Fig. 15 is a view similar to Fig. 13 but, in this case, the solenoid has become inoperative and the belt is on the loose-pulley.

Fig. 16 is a developed diagram showing the wiring, the connections, and electrical gear necessary for automatically controlling the solenoids for the hopper opener, and the valves of the junction structure from a three phase A. C. main or supply.

I have chosen to illustrate in the drawings as a suitable mixing or opening apparatus a combination comprising a hopper opener 3 with filling motion 4 and creeper feed lattice 5 onto which the fibre may be fed, the hopper opener 3 being shown in turn as delivering to a lattice feeder 6. From this lattice feeder 6 the fibre is drawn or carried pneumatically by the action of the fans at $x$ (in known manner) along a conveying tube 7 to a Crighton opener 8 and from the Crighton opener 8 along a conveying tube 9 over a dust-trunk 10 and then along a main conveying tube 11 to a junction structure 12 with two passage conduits or outlet tubes 13, 14. Each of these two tubes 13, 14 are shown leading to a condenser 15, $15^{\times}$ disposed over or combined with a hopper feeder, the hopper feeder adjacent condenser 15 being marked No. 1, and that below condenser $15^{\times}$ being marked No. 2, the said hopper feeders No. 1 and No. 2 being arranged to feed any succeeding combination of apparatus, the drawings showing the hopper feeders No. 1 and No. 2 as supplying a double cylinder opener with lap forming mechanism, but this may obviously vary.

The junction structure at 12 has an accommodating inlet tube 16 which is laterally adjustable and has vertically and independently adjustable pendent plates $16^{\times}$, and the horizontal base or support plate 17 is laterally adjustable, due to the slots and bolts at 18, whilst the pendent plates $16^{\times}$ are vertically adjustable due to the slots and bolts at 19. Either of the pendent plates $16^{\times}$ can be set relatively to the other, and the inherent power of accommodating in the supply tube construction 11 allows any lateral adjustment of the lower end 16 of inlet tube to the junction structure.

By adjustment of the lower end 16 of the inlet tube 11 and/or its pendent plates $16^{\times}$ the size of the available passage-ways leading to the tubes 13, 14 can be adjusted to regulate the air suction or the pull on the fibre and so to ensure that each of the two hopper feeders No. 1 and No. 2 receives a more or less equal amount of cotton when normal feeding is taking place to both at the same time. According to the arrangement just indicated, regulations to suit varied draught or suction, or driving effects, at different periods may be effected.

In connection with the two outlet tubes 13, 14 from the junction structure 12, I provide two valves 20, 21 shown pivoted at $20^{\times}$, $21^{\times}$, that is, I provide a valve for each outlet tube 13, 14. These valves 20, 21 are preferably closed electrically and opened by gravity, but this might possibly be inverted. The springs $a^2$, $b^2$ shown, are to ensure perfect sealing of the valves in the junction structure.

Along with the junction structure 12 I combine solenoids or electrical appliances, and I illustrate solenoids $a$ and $b$ shown in position (Figs. 5 and 6) and the movable spindles $a^1$, $b^1$ of the core elements are connected to lever arms 22, 23, fixed on the axes $20^{\times}$, $21^{\times}$ of the valves 20, 21.

When one or other of these solenoids is energized, one or other of the said valves 20, 21 is closed, just as either valve 20, 21, due to its weight, must fall open when its solenoid is de-energized.

A panel or lock-up casing 24 for the electrical equipment is shown located on the supports of the junction structure 12 and the current to the solenoids $a$ and $b$ is controlled by the quantity of cotton in each "reserve box" or other compartment of the two hopper feeders No. 1 and No. 2.

In each "reserve box" No. 1 and No. 2 is arranged a board 25, pivoted at 26, the board being acted on by a lever 27 with adjustable weight 28. The board 25 in each "reserve box" of each hopper feeder No. 1 or No. 2 is influenced by the weight or quantity of cotton or fibre in the "reserve box", and, in Fig. 9 the dot and dash lines indicate the position of the board 25 in the "down" position when the "reserve box" has an excess of cotton, whilst the dotted lines indicate the "up" position of the board 25 when the "reserve box" is getting empty or short of cotton. Each board 25 for each hopper feeder No. 1 or No. 2 is utilized to influence adjustable mechanical contrivances to move a mercury tube switch $f$ or $g$ suitably fulcrumed and housed.

One of the mercury tube switches and the interconnection between the same and the board 25 is marked $f$, and is separately and well illustrated by Figs. 9 to 12, and the other mercury tube switch $g$ and its connections are similar.

The mercury tube switch $f$ is pivoted at $f^1$ in the housing $f^2$ and a lever arm $f^3$ is jointed to an adjustable connecting rod 29 to the bell-crank lever 30 attached to the pivoted axle 26 of the board 25.

Should a "reserve box" No. 1 or No. 2 be short of cotton then a circuit to the solenoid for the valve in the proper feed tube is broken and the valve falls or remains open, and so long as this occurs, cotton is supplied to condenser 15 or $15^×$ and falls into the "reserve box" of the hopper feeder No. 1 or No. 2.

If both hopper feeders No. 1 and No. 2 require cotton, both valves 20 and 21 in the junction structure 12 and for the two tubes 13 and 14 lie open. Should one "reserve box" be sufficiently full, the movement of the pivoted board 25 or $25^×$ affects the mercury tube switch $f$ or $g$ putting same into open or "break" position (seen in Fig. 11), and, immediately, the solenoid for that valve is energized and the valve is electrically closed in a manner which will later be clearly understood. The feed of cotton continues along the main tube 11 and the off-set second tube, 13 or 14 as the case may be, to the other hopper feeder, which thus receives the whole of the supply from the mixing or opening group via the main tube 11.

At this stage, it is necessary to turn aside to the mixing or opening group, that is, the supply apparatus seen in Figs. 1 and 3, and to say, the driving gear therefor (and of whatever type) is controlled. Figs. 13, 14 and 15 may now be examined. I have shown the hopper opener 3 as being driven by a belt 31 acting on a fast pulley 32, there being a loose pulley 33. A belt-fork 34 is provided, pivoted at 35, the belt-fork 34 being combined with a lever 36 having an adjustable weight 37.

A solenoid $c$ is mounted on a bracket or support adjacent the hopper opener 3, and the core or movable element $c^1$ thereof, is weighted and connected through the lever 36. When the solenoid $c$ is energized, the core $c^1$ pulls up the lever 36 assisted by the weight 37, and the belt-fork 34 shifts and holds the belt 31 on the fast pulley 32 (see Fig. 13) and consequently the hopper opener 3 is driven to supply cotton. On the de-energizing of the solenoid $c$, the release and fall of the core $c^1$ causes the belt-fork 34 to shift the belt 31 onto the loose pulley 33 (see Fig. 15) and the driving of the hopper opener 3 ceases.

When the solenoid $c$ is de-energized, further contacts are broken or an auxiliary switch in the electrical control circuit is opened, to ensure that either of the valves 20 or 21 for the two feed tubes 13, 14, which was previously closed, be then instantaneously opened.

The object of this will be understood, for should it be possible for both valves to close when the two hopper feeders are fully charged and the hopper opener 3 of the mixing or opening apparatus continues to feed the fibre into the main tube 11, the supply would grow quickly in the tube 11, and, there being no outlet, the fibre would become choked in the pipe 11. Although the hopper opener 3 or opening or mixing group of machines is stopped when the "reserve box" of the second hopper feeder is fully supplied (that is, when both "reserve boxes" for No. 1 and No. 2 hopper feeder are fully supplied), the cotton in transit and suspended in the main tube 11 (with both valves 20 and 21 closed) would not then be allowed to pass forward to the "reserve boxes" of the hopper feeders No. 1 and No. 2, and so would fall and lodge in the tube 11. Such a condition would be very detrimental to the satisfactory working of any pneumatic arrangement for the conveyance of opened fibre. Therefore, I arrange, that when one hopper feeder No. 1 or No. 2 is sufficiently supplied with fibre, the electrical control, which is governed from the pivoted door in its own respective hopper feeder, closes the valve in its particular feed tube, and the supply of fibre is therefore directed to the other hopper feeder. When this other hopper feeder is fully supplied, then its pivoted board opens the mercury tube switch, and the whole electrical control circuit is ruptured, because both mercury tube switches are in the "break" position. Thus, the solenoid $c$ for the belt shifting mechanism of the mixing or opening group is de-energized and the belt 31 is shifted by the belt-fork 34 onto the loose pulley 33. Also, the current is shut off from the solenoids $a$ and $b$ which operate to close the two valves 20, 21, allowing the valve, which was previously closed when the first hopper was fully charged, to now fall open.

The result of this is, the feed supply from hopper opener 3 of the mixing or opening group stops, whilst the suspended cotton in the main tube 11 passes along past the two open valves 20, 21 and is equally distributed to the two hopper feeders No. 1 and No. 2, and such balance is cleared away and the main feed tube 11 from the mixing or opening group (hopper opener 3) is emptied or sufficiently emptied.

This condition appertains, until one or other of hopper feeders No. 1 and No. 2 requires a further supply, when the particular pivoted board 25, by moving upwards to the position shown by dotted lines in Fig. 9, and thus tilting the mercury tube switch into the position seen in Fig. 12, becomes instrumental in restoring the electrical circuit to operative condition, whereupon the solenoid $c$ actuates, through the lever 36, the belt-fork 34, shifting the belt 31 to the fast pulley, thus re-starting the hopper opener 3 of the mixing or opening group, and cotton then passes along the main tube 11 and so on to the off-set tube to feed the condenser device 15 or $15^x$, and to fall into the "reserve box". If both valves 20 and 21 have been open and the hopper opener 3 of the mixing or opening group has been stopped, the operation of the mercury tube switch for the hopper feeder first requiring cotton, and first bringing about starting of said hopper opener 3, acts automatically through the electrical provision to temporarily close the valve controlling the supply to the other hopper feeder in a manner which will be later clear, whilst immediately such other hopper feeder requires cotton, its temporarily closed valve will automatically fall open again, as will also be clear when the action of the electrical equipment is described.

Thereafter, as requisite, the valves are at all times automatically controlled.

I am in no way limited as to system of circuits or electrical equipment, or exact mechanical contrivances, so long as I obtain the necessary automatic governing from mixing or opening apparatus to a plurality of hopper feeder groups, and are able to control by valves or equivalents the supply to each of such groups, and to control the supply being fed, and dispose of the balance of floating cotton in the main tube, after shutting off the supply whilst also providing for automatic re-starting of the feed all by a controlled electrical system and the requisite electrical parts and mechanism.

In order to make clear how the entire working can be electrically controlled I have, at Fig. 16, shown a clear and grouped diagram of the electrical equipment and the circuits, to which the readers attention is particularly directed. The arrangement is suitable to an A. C. current supply, 3 phase. The thick lines in the diagram are the main circuit. The thin lines represent the coil circuit. The main switch is lettered $s$, the mercury tube switches are marked $f$ for hopper feeder No. 1 and $g$ for hopper feeder No. 2, and their corresponding solenoids $a$ and $b$, as in the other Figures of the drawings. The solenoid for the hopper opener 3 is marked $c$.

The relays controlled by the mercury tube switches $f$ and $g$ are marked $d$, $e$, whilst the contactors for the solenoids $a$ and $b$ are marked $l$, $m$, and their operating coils $l^1$, $m^1$. The contactor for the solenoid $c$ of the hopper opener is marked $n$ and its operating coil $n^1$, the contactor $n$ moving with it the auxiliary switch $h$. The return wire is marked $r$.

The condition represented in Fig. 16 is one in which each hopper feeder No. 1 and No. 2 has an excess supply of cotton, the pivoted boards 25 are in the depressed or dot and dash position and both mercury tube switches $f$ and $g$ are open, as are the valves 20 and 21. The solenoid $c$ is out of action and hopper opener 3 is not being driven and cotton is not being supplied to tube 11. Suppose hopper feeder No. 1 requires cotton, the pivoted board 25 has moved up into the "empty" position, see the dotted lines Fig. 9, and connecting rod 29 is operated to close the mercury tube switch $f$ (see Fig. 12). The effect of this is, current passes to the relay $d$ which opens on the left-hand (further breaking the coil circuit to operating coil $l^1$ and contactor $l$) at the same time closing on the right-hand and opening up the coil circuit so that current passes to the operating coil $n^1$, the latter closing the contactor $n$, and so solenoid $c$ is energized and the belt 31 is shifted onto the fast pulley 32 and hopper opener 3 is driven to supply cotton to the tube 11. At the same time as the closing of the contactor $n$ took place, the auxiliary switch $h$ was closed, and, as a consequence, current is able to pass along the coil circuit to relay $e$ (but not to relay $d$) and so to reach operating coil $m^1$ to operate contactor $m$ and energize solenoid $b$ thus closing valve 21 governing the tube 14 leading to hopper feeder No. 2. It is clear the supply along tube 11 has been started, the valve 21 is closed and the cotton is being wholly passed to hopper feeder No. 1.

Now should hopper feeder No. 2 require cotton, then its pivoted board 25 having assumed its "empty" position, the mercury tube switch $g$ is closed (in similar manner to that already described) and the relay $e$ is operated cutting off current to the operating coil $m^1$ so that the contactor $m$ flies open, as in Fig. 16, and solenoid $b$ is de-energized and consequently the valve 21 falls open.

If from the condition represented in Fig. 16, (which as already stated is this, that both hopper feeders No. 1 and No. 2 have an excess of cotton and the hopper opener 3 is stopped) it should be that hopper feeder No. 2 first requires a supply, the operation is an inversion of that detailed.

If either or both mercury tube switches $f$, $g$ are closed, the solenoid $c$ is energized, but, if both are open, then solenoid $c$ is not energized. If both mercury tube switches $f$, $g$ are open, the coil circuit is broken and all the solenoids $a$, $b$, $c$ go out of action.

Should both hopper feeders No. 1 and No. 2 require cotton, solenoid $c$ remains in action because the coil circuit is closed.

When one mercury tube switch is closed, solenoid $c$ is energized and the other solenoid (either $a$ or $b$) is energized to close one or other of the valves 20, 21.

The relays $d$ and $e$ are controlled or operated by the mercury tube switches $f$ and $g$, that is, when the mercury tube switch $f$ or $g$ closes, the relay $d$ or $e$ opens on the left-hand and closes on the right-hand, whilst on the opening of the mercury tube switch $f$ or $g$ the relay $d$ or $e$ closes on the left-hand and opens on the right-hand or moves into the position shown in Fig. 16.

I regard as a matter of importance the fact that both valves 20, 21 are never closed at the same time.

Also I attach value to this, that, with the arrangements described, there exists in effect dual control, in this sense, the feed supply can be started from either hopper feeder No. 1 or No. 2 following failure of an "excess" supply condition in either hopper feeder No. 1 or No. 2, and either valve can be controlled from the other hopper feeder with the same conditions, whilst either mercury tube switch can come into action to open its previously closed valve immediately a need for cotton supply to that hopper feeder occurs following the starting of the feed supply.

It might be advantageous under certain conditions to make use of additional solenoids in connection with the lower ends of the plungers or core stems of the solenoids $a$ and $b$ if it be desired to give more definite control as to fall of the valves 20, 21, say in cases where cotton requires to be drawn a considerable distance from preliminary opening or feeding machines as, under such circumstances, the fans of the condensers might require to be speeded up, and so the ready fall of the valves by gravity alone could possibly be interfered with, this variation amounting merely to positive or assisted opening of the valves by electrical action.

I claim:

1. Apparatus wherein cotton or like fibre is to be pneumatically conveyed from feeding or opening machine to a plurality of opening or refining machines, and comprising a junction structure, a plurality of conduits combined with the junction structure, a plurality of valves controlling the passage of fibre along said conduits, means to operate said valves, a plurality of opening or refining machines, means mounted in the plurality of opening or refining machines adapted to be effected by the quantity of fibre contained to become operative, and switch gear, a feeding or opening machine, drive control mechanism combined with the feeding or opening machine, means to operate said drive control mechanism, and electrical devices controlled by the switch gear, to automatically operate the means which control the plurality of valves at the junction structure and the means which control the drive mechanism for the feeding or opening machine, and operating in manner that when the plurality of opening or refining machines are fully supplied, the feeding or opening machine will be automatically stopped, and when not fully supplied will be started, and when any of the plurality of opening or refining machines has a sufficient or an insufficient supply of cotton its particular valve is automatically closed or automatically opened.

2. Apparatus wherein cotton or like fibre is to be pneumatically conveyed from a preliminary feeding or opening machine to a plurality of opening or refining machines, and comprising a junction structure, a plurality of conduits combined with said junction structure, a plurality of valves in operative connection with said plurality of conduits, means to operate said plurality of valves, said means comprising electrical devices, a plurality of opening or refining machines, movable means mounted in the plurality of opening or refining machines and adapted to be effected by the quantity of fibre contained, switch gear combined with said plurality of opening or refining machines, connections intermediate of said movable means and said switch gear to automatically control the electrical devices which govern the means which control the plurality of valves at the junction structure, drive mechanism in connection with the preliminary feeding or opening machine, means to control said drive mechanism, electrical devices governing said means and operative to start or stop said preliminary feeding or opening machines, all in this sense, when the entire plurality of opening or refining machines are fully supplied, the feeding or opening machines can be automatically stopped, and when not fully supplied they are started, and that when any of the plurality of opening or refining machines has a sufficient or an insufficient supply of cotton the particular valve is automatically closed or automatically opened as the case may be, the control being however such that all the valves are never shut at the same time.

3. Apparatus wherein cotton or like fibre is to be pneumatically conveyed from feeding or opening machines to a plurality of opening or refining machines, and comprising a junction structure, conduits leading therefrom to a plurality of opening or refining machines, a plurality of valves in connection with the junction structure, means to automatically control said plurality of valves consisting of electrical devices, driving mechanism in connection with the feeding or opening machines, means to automatically govern said driving mechanism, said means being electrically controlled, the plurality of opening or refining machines having movable means located therein, and switch provision with interconnecting mechanism between the movable means and the switch provision to govern the latter, all whereby the feeding or opening machine and the valves for the plurality of opening or refining machines are governed electrically in such a manner, that when the plurality of opening or refining machines are fully supplied the feeding or mixing machines are automatically stopped, and when not fully supplied they are automatically started, and when any of the plurality of opening or refining machines has a sufficient or an insufficient supply of cotton the particular valve is automatically closed or automatically opened as the case may be, and so that one opening or refining machine requiring cotton may effect a temporary closure to another opening or refining machine, the control, however, being such that all the valves are never shut at the same time, so that choking of the feed conduits cannot take place.

4. Apparatus wherein cotton or like fibre is to be pneumatically conveyed from a preliminary apparatus to a plurality of opening or refining machines, and comprising a preliminary apparatus, a plurality of opening or refining machines, and interconnecting means, and a junction structure, a plurality of conduits leading therefrom to the plurality of opening or refining machines, a plurality of valves in connection with the conduits from the junction structure, operative connections to such valves and solenoids to control the plurality of valves, driving mechanism in connection with the preliminary apparatus, means for rendering such driving mechanism operative or inoperative including a solenoid, movable means mounted in connection with the plurality of opening or refining means, and switch provision and connecting mechanism between the movable means and the switch provision, and electrical equipment for controlling the solenoids to govern the plurality of valves in the junction structure and the driving mechanism in connection with the preliminary apparatus in accordance with the position of the movable means in the opening or refining machines as set forth.

5. Apparatus wherein cotton or like fibre is to be pneumatically conveyed from a preliminary apparatus to a plurality of opening or refining machines, and comprising a preliminary apparatus, a plurality of opening or refining machines, and interconnecting means and a junction structure intermediate of the aforesaid groups of machines, conduits in connection with the junction structure, and adjustable devices in connection with the junction structure to regulate passage way to the conduits, a plurality of valves governing passage through the conduits, operative connections combined with said valves, solenoids to work said valves when required, driving mechanism in connection with the preliminary machines, means to operate the mechanism and a solenoid to automatically control said driving mechanism for the purpose of making same operative or inoperative, movable means combined in the plurality of opening or refining means and switch provision in connection thereto, and interconnecting device intermediate of the movable means and the switch provision, and electrical equipment and electrical connections between the switches, solenoids and source of energy, all for the purposes of controlling the solenoids to govern the plurality of valves at the junction structure and the solenoid and driving mechanism in connection with the preliminary apparatus and in accordance with the action of the movable means in the opening or refining machines.

6. Apparatus wherein cotton or like fibre is to be pneumatically conveyed from a preliminary apparatus to a plurality of opening or refining machines, and comprising a preliminary apparatus, a plurality of opening or refining machines, and interconnecting means along which the cotton is conveyed pneumatically, and with a junction structure intermediate of the aforesaid groups of machines, conduits in connection with the junction structure, and adjustable devices in the junction structure, means to set and fix such adjustable devices to regulate passage way along the conduits, a plurality of valves in connection with the junction structure and governing passage way through the conduits, operative connections to the plurality of valves, solenoids to work said valves, driving means for the preliminary machine, mechanism to control said driving means, and a solenoid adapted to work said mechanism as required for the purpose of rendering same operative or inoperative, movable means located in the plurality of opening or refining machines, and switch provision in connection with said plurality of opening or refining machines, connections between the movable means and the switch provision, and electrical equipment and electrical connections between the switches, solenoids, and source of energy for the purposes of controlling the solenoids and so governing the plurality of valves at the junction structure and the solenoid and control mechanisms in connection with the preliminary apparatus, and whereby the feed of cotton can be started or stopped and whereby the valves are never all closed at one time for the purposes related.

7. Apparatus wherein cotton or like fibre is to be pneumatically conveyed from a preliminary apparatus to a plurality of opening or refining machines, and comprising a preliminary apparatus, pneumatic conveying tubes, and a plurality of opening or refining machines, and with a junction structure intermediate of the aforesaid groups of machines, and conduits leading from the junction structure, and adjustable devices in the junction structure, and means to fix same on adjustment, a plurality of valves at the junction structure to regulate passage of cotton along the conduits, operative connections for the valves, solenoids to operate said plurality of valves through said connections, driving means for the preliminary machine, controllable mechanism to render such driving means operative or inoperative, and a solenoid adapted to do the controlling, movable means located in the plurality of opening or refining machines and also switch provision in connection therewith, and connections between said movable means and the switch provision and electrical devices and electrical connections controlled by the switch provision and adapted to serve the solenoids to govern the plurality of valves in the junction structure and the solenoid controlling the driving of the preliminary machine all whereby the plurality of valves are never all shut at any time, and whereby the feed of cotton can be stopped when the plurality of feeding or refining machines have a full supply.

8. Apparatus wherein cotton or like fibre is to be pneumatically conveyed from a preliminary apparatus to a plurality of opening or refining machines, and comprising a preliminary apparatus, pneumatic conveying provision, and a plurality of opening or refining machines, and with a junction structure, adjustable devices in said structure, means to fix same, a plurality of valves mounted in the junction structure, a plurality of solenoids with connections to the plurality of valves, a plurality of conduits between the junction structure and the plurality of opening or refining machines, drive mechanism for the preliminary apparatus, means to shift said drive mechanism, a solenoid to control the drive shifting means and electrical connections to supply current to the said solenoid, movable means in the plurality of opening or refining machines, and movable switches for said machines and housing provision therefor, and connecting mechanism between the movable means and the movable switches and governed by the quantity of fibre present in said plurality of opening or refining machines, and electrical devices and connections controlled by the action of the movable means in the opening or refining machines on the switches to supply or cut off current to the solenoids to govern the plurality of valves in the junction structure and to the solenoid serving to render the driving mechanism for the preliminary machine operative or inoperative, and whereby the feed of cotton can be stopped or started according to requirements of the plurality of opening or refining machines, and whereby the plurality of valves are never all closed, for the purposes related.

In testimony whereof I have signed my name to this specification.

HENRY WILKINSON.